(12) United States Patent
Shon et al.

(10) Patent No.: US 12,351,507 B2
(45) Date of Patent: Jul. 8, 2025

(54) GLASS PLATE LOADING CASSETTE AND CHEMICAL STRENGTHENING SYSTEM INCLUDING THE SAME

(71) Applicant: Samsung Display Co., LTD., Yongin-si (KR)

(72) Inventors: Hui Yeon Shon, Seongnam-si (KR); Hyun Ji Lee, Gimhae-si (KR); Hoi Kwan Lee, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 683 days.

(21) Appl. No.: 17/560,045

(22) Filed: Dec. 22, 2021

(65) Prior Publication Data
US 2022/0363592 A1 Nov. 17, 2022

(30) Foreign Application Priority Data

May 14, 2021 (KR) .................. 10-2021-0062592

(51) Int. Cl.
*C03C 21/00* (2006.01)
(52) U.S. Cl.
CPC ................. *C03C 21/002* (2013.01)
(58) Field of Classification Search
CPC .................................. C03C 21/002
See application file for complete search history.

(56) References Cited

U.S. PATENT DOCUMENTS

2012/0308722 A1* 12/2012 Suzuki .......... C03C 21/008
427/374.4
2018/0148373 A1* 5/2018 Harris .......... B08B 9/42

FOREIGN PATENT DOCUMENTS

| KR | 1020110075852 A | 7/2011 |
| KR | 1020110107462 A | 10/2011 |
| KR | 1020120038079 A | 4/2012 |
| KR | 20130085643 A * | 7/2013 |
| KR | 20130123829 A * | 11/2013 |
| KR | 1020130123829 A | 11/2013 |
| KR | 101357771 B1 | 2/2014 |
| KR | 1020150072540 A | 6/2015 |
| KR | 101684344 B1 | 12/2016 |
| KR | 101825276 B1 | 2/2018 |
| KR | 101972444 B1 | 4/2019 |

OTHER PUBLICATIONS

Translation of KR-20130123829 (Year: 2013).*

* cited by examiner

*Primary Examiner* — Cynthia Szewczyk
(74) *Attorney, Agent, or Firm* — CANTOR COLBURN LLP (57) ABSTRACT

An embodiment provides a chemical strengthening system, including: a strengthening part in which chemical strengthening of a glass plate is performed; a heating part in which a post-heat treatment of the glass plate is performed; and a cassette in which the glass plate is loaded and which is movable between the strengthening part and the heating part. The cassette includes a lower support which supports a lower end portion of the glass plate, the lower support is rotatable with respect to an axis of rotation, and the axis of rotation does not move relatively within the cassette.

10 Claims, 11 Drawing Sheets

GLASS PLATE LOADING CASSETTE AND CHEMICAL STRENGTHENING SYSTEM INCLUDING THE SAME

This application claims priority to Korean Patent Application No. 10-2021-0062592 filed on May 14, 2021, and all the benefits accruing therefrom under 35 U.S.C. § 119, the content of which in its entirety is herein incorporated by reference.

BACKGROUND

(a) Technical Field

This disclosure relates to a glass plate loading cassette and a chemical strengthening system including the same.

(b) Description of the Related Art

Glass may be increased in strength by a chemical strengthening process. For example, when a glass plate is immersed in a potassium nitrate ($KNO_3$) solution in a strengthening bath, sodium ions ($Na^+$) and potassium ions ($K^+$) on a surface of the glass plate are substituted, and a compressive stress layer due to ion exchange reaction is formed on the surface of the glass plate. Therefore, a surface density of the glass plate may be strengthened, growth of microcracks may be suppressed, and flexural strength of the glass plate may be increased.

In order to strengthen a plurality of glass plates at once, a cassette capable of loading the plurality of glass plates may be used. That is, the plurality of glass plates may be loaded in the cassette so that the glass plates and the cassette are immersed in the potassium nitrate solution in the strengthening bath.

SUMMARY

After completion of the chemical strengthening process, a post-heating process may be performed while the glass plate is loaded in the cassette. In this case, an ion exchange salt remains in a contact portion between the glass plate and the cassette and the residual salt is solidified, resulting in poor appearance quality of the glass plate. In addition, due to a difference between thermal expansion coefficients of the glass and the salt, an interfacial stress may be formed during the solidification of the residual salt to deform the glass plate. Such poor appearance quality may easily occur when the glass plate is thin.

Embodiments are to provide a glass plate loading cassette and a chemical strengthening system including the same that may prevent or reduce appearance quality defects of a glass plate.

An embodiment provides a chemical strengthening system, including: a strengthening part in which chemical strengthening of a glass plate is performed; a heating part in which a post-heat treatment of the glass plate is performed; and a cassette in which the glass plate is loaded and which is movable between the strengthening part and the heating part. The cassette includes a lower support which supports a lower end portion of the glass plate, the lower support is rotatable with respect to an axis of rotation, and the axis of rotation does not move relatively within the cassette.

The chemical strengthening system may further include a motor which rotates the lower support.

The chemical strengthening system may further include: a discharging part overlapping the heating part, and a mesh member positioned between the heating part and the discharging part. During the post-heat treatment, the cassette may be positioned on the mesh member.

The lower support may contact the mesh member, and when the lower support is rotated, the cassette may move on the mesh member.

The axis of rotation of the lower support may be perpendicular to a moving direction of the cassette.

The chemical strengthening system may further include: a motor which drives the cassette to move in a straight line on the mesh member. The lower support may be rotated when the cassette is moved.

During the post-heat treatment, the lower support may be rotated, and a salt remaining on the glass plate may flow down to the discharging part through the lower support and the mesh member.

The lower support may be provided as three or more lower supports.

The lower support may define a support groove formed concentrically with respect to the axis of rotation, and the glass plate may be disposed so that a lower end of the glass plate is positioned in the support groove.

The cassette may further include a frame, and the lower support may include a shaft inserted into a groove of the frame and define a support groove in which the lower end of the glass plate is positioned.

The cassette may further include an upper support coupled to the frame to hold opposite sides of an upper portion of the glass plate.

The cassette may further include a middle support coupled to the frame to hold opposite sides of a middle portion of the glass plate.

The chemical strengthening may be performed at a temperature of 360 degrees in Celsius (° C.) to 370° C., and the post-heat treatment may be performed at a temperature of 330° C. to 370° C.

Another embodiment provides a glass plate loading cassette, including: a frame; and a lower support coupled to the frame and which supports a lower end of the glass plate. The lower support may be rotatable with respect to an axis of rotation which does not move relatively within the cassette.

The frame may include a pair of support plates facing each other; and the lower support may include a shaft inserted into grooves of the support plates, and define a support groove formed concentrically with respect to the axis of rotation.

The lower support may be provided as three or more lower supports.

A distance between two adjacent lower supports of the three or more lower supports may be smaller than a radius of one of the three or more lower supports.

The cassette may further include a pair of upper supports which are coupled to the frame and hold opposite sides of an upper portion of the glass plate.

The cassette may further include a pair of middle supports which are coupled to the frame and hold opposite sides of a middle portion of the glass plate.

The frame may define a groove or a slit through which a coupling position of the upper support with the frame is changeable.

According to the embodiments, it is possible to remove a residual salt without chemical treatment in a post-heating process after a chemical strengthening process of a glass plate. Accordingly, it is possible to prevent appearance quality defects of the glass plate due to solidification of the residual salt or to improve appearance quality thereof.

Further, according to the embodiments, there is an advantageous effect that may be recognized throughout the present specification.

DETAILED DESCRIPTION

The invention will be described more fully hereinafter with reference to the accompanying drawings, in which embodiments are shown.

A size and thickness of each element illustrated in the drawings are arbitrarily shown for ease of description.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element such as a layer, film, area, region, or substrate is referred to as being "on" another element, it can be directly on the other element or intervening elements may also be present. In contrast, when an element is referred to as being "directly on" another element, there are no intervening elements present.

In the specification, unless explicitly described to the contrary, the word "comprise" and variations such as "comprises" or "comprising" will be understood to imply the inclusion of stated elements but not the exclusion of any other elements.

In the specification, "connected" does not mean only when two or more elements are directly connected, but when two or more elements are indirectly connected through other elements, and when they are physically connected or electrically connected, and further, it may be referred to as elements with different names depending on a position or function, and may also be referred to as a case in which respective parts that are substantially integrated are linked to each other.

In the drawings, as symbols x, y, and z used for indicating directions, 'x' is a first direction, 'y' is a second direction perpendicular to the first direction, and z is a third direction perpendicular to the first direction and the second direction. The first direction (x), the second direction (y), and the third direction (z) may correspond to a horizontal direction, a vertical direction, and a thickness direction of the display device, respectively.

In the present specification, unless otherwise noted, "being overlapped" means being overlapped when viewed in a plan view (i.e., top view), and being overlapped in the third direction (z).

Figure 1:
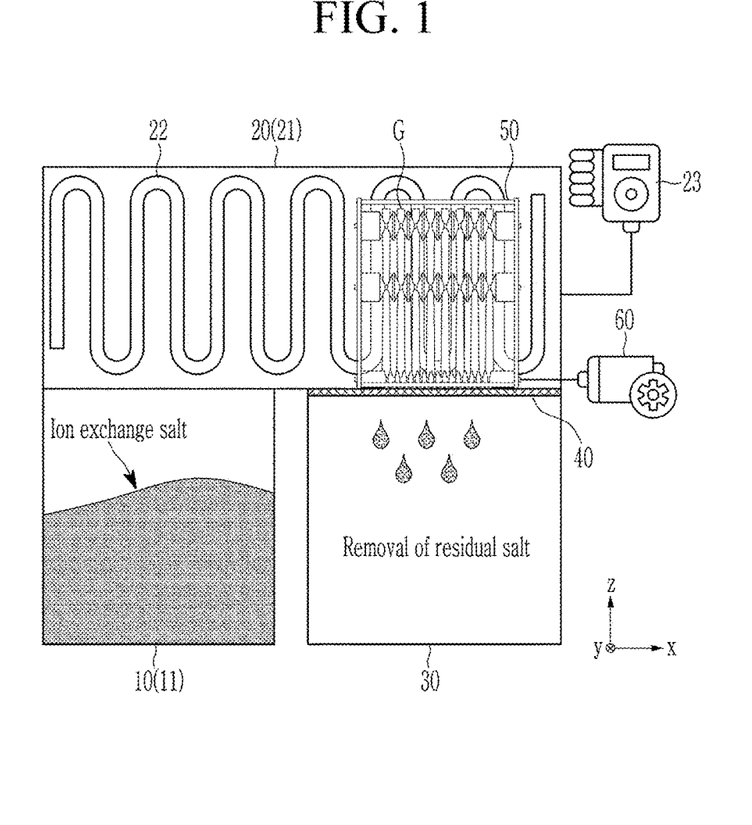
FIG. 1 and FIG. 2 each schematically illustrate a chemical strengthening system according to an embodiment.
Figure 2:
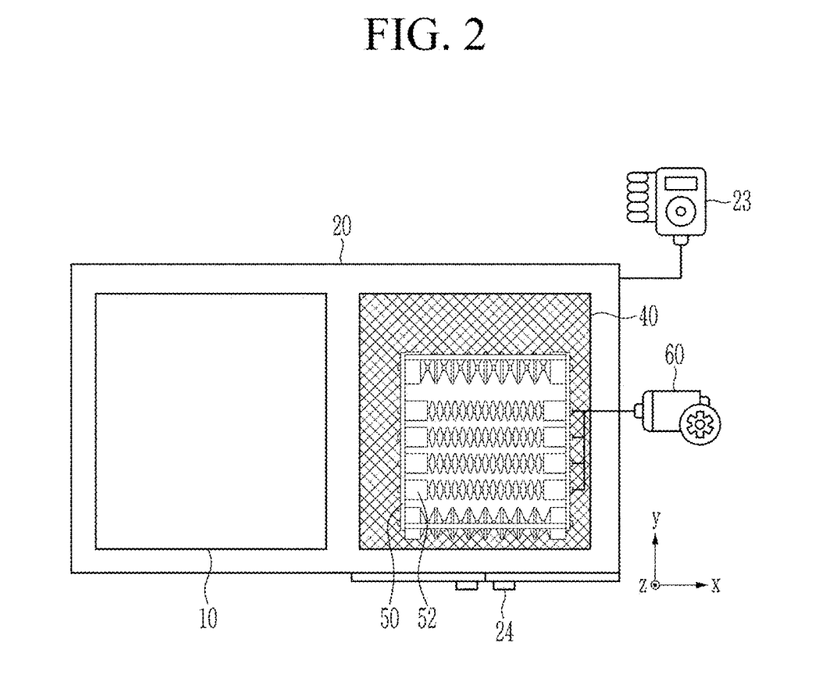
Figure 3:
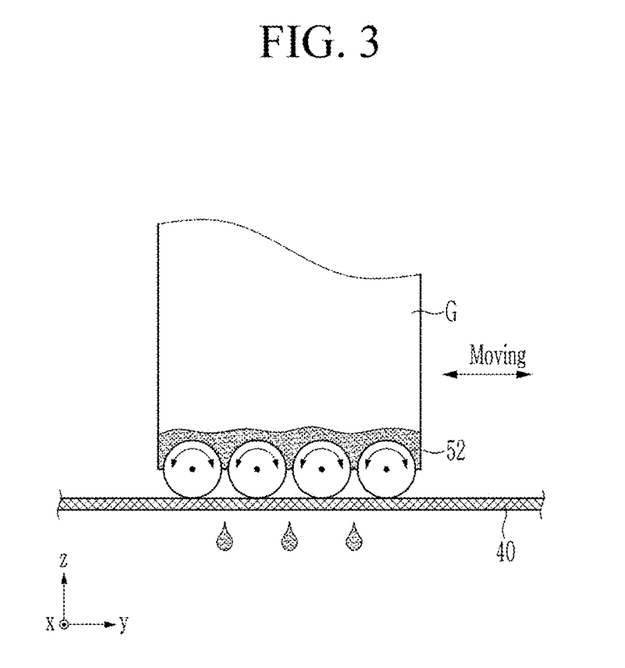
FIG. 3 illustrates a schematic view for explaining removal of a residual salt in the chemical strengthening system illustrated in FIG. 1 and FIG. 2.

FIG. 1 and FIG. 2 each schematically illustrate a chemical strengthening system according to an embodiment, and FIG. 3 illustrates a schematic view for explaining removal of a residual salt in the chemical strengthening system illustrated in FIG. 1 and FIG. 2. FIG. 1 and FIG. 2 may correspond to a front view and a top plan view of the chemical strengthening system, respectively.

Referring to FIG. 1 and FIG. 2, the chemical strengthening system may include a strengthening part 10, a heating part 20, and a discharging part 30. The chemical strengthening system may include a mesh member 40 positioned between the heating part 20 and the discharging part 30. The chemical strengthening system may include a glass plate loading cassette 50 (hereinafter simply referred to as a cassette) movably disposed between the strengthening part 10 and the heating part 20, and a motor 60 for rotating a lower support 52 of the cassette 50.

A glass plate G may be loaded in the cassette 50. The glass plate G may have a thickness of about 50 micrometers (μm) or less, for example about 20 μm to about 50 μm. The glass plate G may have a Young's modulus of about 100 Gigapascals (GPa) or less at room temperature, for example, a Young's modulus of about 65 GPa to about 75 GPa. The glass plate G loaded in the cassette 50 is shown in FIG. 1, but is not shown in FIG. 2. The strengthening part 10 may include a strengthening bath 11, and a solution containing a molten salt for ion exchange therein. The molten salt may include potassium nitrate. In the strengthening part 10, the glass plate G may be chemically strengthened by an ion exchange method. The chemical strengthening using the ion exchange method is a method of forming a compressive stress layer on a surface stress of the glass plate by replacing alkali ions of the glass plate G with other alkali ions. For example, when the glass plate is immersed in the molten salt of the strengthening part 10, a sodium ion ($Na^+$) of the glass plate G may be substituted with a potassium ion ($K^+$) having a larger ionic radius than the sodium ion ($Na^+$).

The heating part 20 may be positioned on the strengthening part 10. The heating part 20 may include a chamber 21, and a heater 22 and a temperature controller 23 positioned inside and outside the chamber 21, respectively. The heating part 20 may include a door 24 for inputting and outputting the cassette 50 into and out of the chamber 21.

The door 24 may be positioned on the front or back of the chemical strengthening system. The heating part 20 may be used to post-heat the glass plate G after the chemical strengthening. The heating part 20 may also be used to pre-heat the glass plate G before the chemical strengthening.

After the chemical strengthening, salt remains in the cassette 50 conveyed to the heating part 20 and the glass plate G loaded thereon, and this residual salt may flow down to the discharging part 30. For smoothly discharging of the residual salt, the mesh member 40 may be disposed between the heating part 20 and the discharging part 30. The cassette 50 may be placed over the mesh member 40, and the residual salt may flow through holes in the mesh member 40 to the discharging part 30. The mesh member 40 may overlap the discharging part 30, and the discharging part 30 may be positioned so as to not overlap the strengthening part 10 in the top view. In order for the cassette 50 to be placed on the mesh member 40 after the chemical strengthening, the cassette 50 may move in a third direction z and then in a first direction x.

The cassette 50 may be introduced into the heating part 20 through the door 24 of the heating part 20, and may be discharged to the outside of the heating part 20 through the door 24. The cassette 50 may be conveyed between the strengthening part 10 and the heating part 20 by a conveying device (not shown). The cassette 50 may load a plurality of glass plates G therein. The glass plate G in the cassette 50 may be disposed so that a main surface of the glass plate G is parallel to a plane defined by the second direction y and the third direction z. The cassette 50 may include the lower support 52 for supporting the glass plate G at a lower portion thereof. The cassette 50 may be made of or include a material such as a metal, a metal alloy (for example, stainless steel), or plastic (for example, "PVC").

Figure 4:
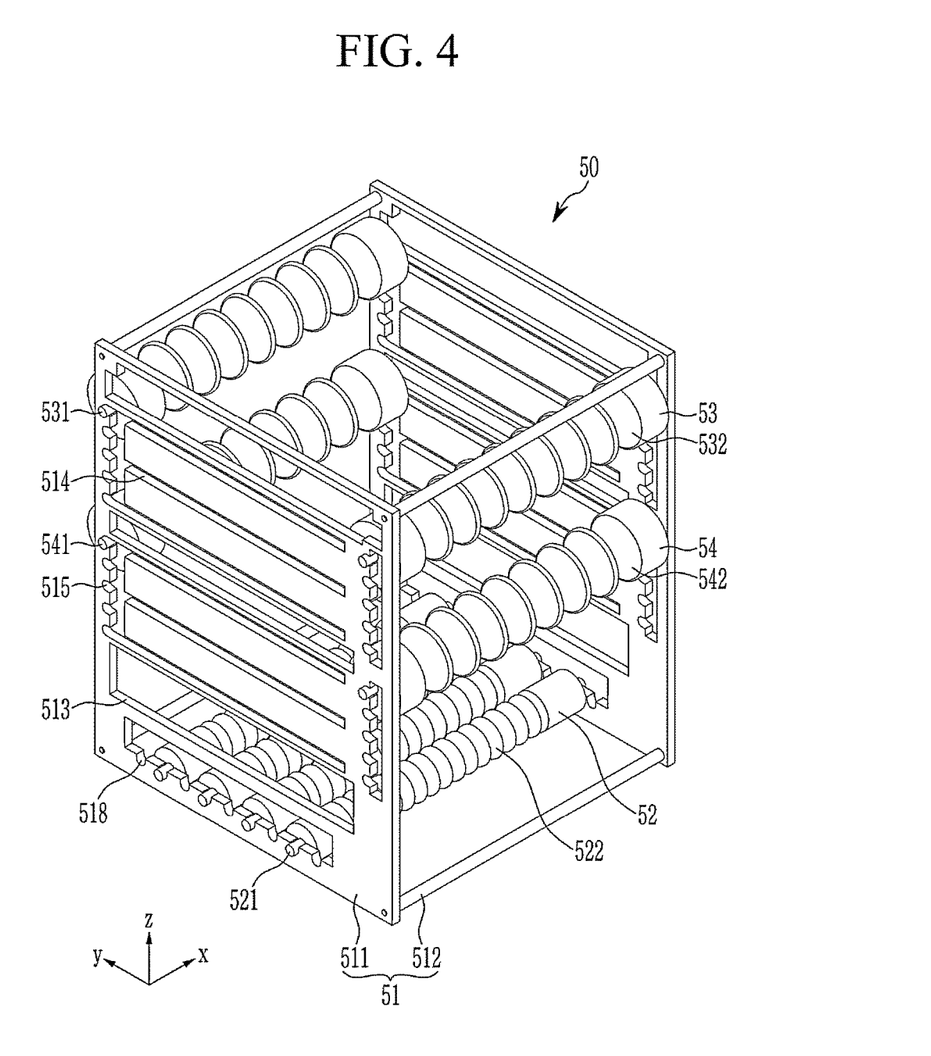
FIG. 4 illustrates a perspective view of a glass plate loading cassette according to an embodiment.

A support plate 511 may be rotatably coupled to a shaft 521 of the lower support 52 (See FIG. 4). For rotation of the lower support 52, the lower support 52 may be coupled to the motor 60. In other words, the motor 60 may be driven so that the lower support 52 rotates around a rotation axis which extends in the first direction x. The motor 60 may be positioned outside the cassette 50, and may be mechanically coupled to the lower support 52, particularly, the shaft 521 of the lower support 52, through a power transmission device. A plurality of lower supports 52 may be rotationally driven by one motor 60, and the motor 60 may be individually provided or coupled to each of the lower supports 52. For example, the motor 60 may be coupled to the shaft 521 of each lower support 52.

FIG. 3 shows a relationship between the lower support 52 of the cassette 50, the glass plate G, and the mesh member 40. Referring to FIG. 3, the lower support 52 supports the glass plate G, and a lower end of the glass plate G may directly contact the lower support 52. After the chemical strengthening, during the post-heating in the heating part 20, the residual salt may flow down to the lower end of the glass plate G by gravity. The residual salt may be solidified under a high temperature of the post-heating process, and when it is solidified on the surface of the glass plate G or at the contact portion of the glass plate G and the cassette 50, poor appearance quality such as wrinkles or dents may occur on the glass plate G. Particularly, when the glass plate G is, for example, an ultra-thin glass plate of 50 μm or less, 30 μm or less, or 20 μm or less, a possibility of poor appearance quality may increase due to a decrease in rigidity of the glass plate G.

As in the embodiment according to the invention, by rotating the lower support 52 for supporting the lower end of the glass plate G, the residual salt is not formed on the lower end of the glass plate G or does not collect in the contact portion of the glass plate G with the lower support 52, but the residual salt may flow down on the lower support 52. That is, by rotating the lower support 52, a surface area of the residual salt contacting the lower support 52 may be increased, and the residual salt may be removed through a drain effect according to the contact with the lower support 52 from the glass plate G. The residual salt flowing down the lower support 52 may fall through the mesh member 40 to the discharging part 30.

Even though the glass plate G may be stably supported by just two lower supports 52, in order to increase the contact area between the lower end of the glass plate G and the lower support 52 (that is, to increase the contact point between the glass plate G and the lower support 52), the cassette 50 may include three or more lower supports 52. When the number of the lower supports 52 is increased, the contact points at which the residual salt at the lower end of the glass plate G may flow down through the lower support 52 increases. Therefore, the residual salt removal effect may be further improved. In order to obtain evenly contact points in the entire lower end of the glass plate G, the lower supports 52 may be arranged at equal intervals. In order to dispose more lower supports 52, a distance between two adjacent lower supports 52 may be, for example, smaller than a radius of one lower support 52 as shown in FIG. 3.

The lower support 52 may contact the mesh member 40. As the lower support 52 rotates, the cassette 50 may move in a second direction y. If the cassette 50 is fixed even when the lower support 52 rotates, the residual salt may accumulate in the contact portion of the lower support 52 with the mesh member 40. In contrast, in an embodiment according to the invention, when the cassette 50 moves, the contact portion between the lower support 52 and the mesh member 40 also moves, so it may be more advantageous for discharging residual salt. Since a width of the mesh member 40 in the second direction y is limited, which is a moving direction of the cassette 50, for example, the lower support 52 may rotate clockwise until the cassette 50 moves from a first point to a second point of the mesh member 40, and when the cassette 50 reaches the second point, the lower support 52 may rotate counterclockwise until the cassette 50 moves back to the first point of the mesh member 40. That is, the lower support 52 may operate to rotate clockwise and counterclockwise repeatedly so that the cassette 50 may reciprocate along the second direction y on the mesh member 40.

The movement direction of the cassette 50 according to the rotation of the lower support 52 on the mesh member 40 may vary according to the disposition of the cassette 50. For example, when the cassette 50 is disposed so that an axis of the lower support 52 is parallel to the second direction y, the cassette 50 may move in the first direction x when the lower support 52 is rotated.

The lower support 52 may not contact the mesh member 40, and even if the lower support 52 contacts the mesh member 40, the cassette 50 may be fixed so as to not move in the second direction y. Some of the lower supports 52 may be rotated in the clockwise direction, and some other thereof may be rotated in the counterclockwise direction.

FIG. 4 illustrates a perspective view of a glass plate loading cassette according to an embodiment.

The structure of the cassette 50 will be described in more detail with reference to FIG. 4. The cassette 50 may include a frame 51, the lower support 52, an upper support 53, and a middle support 54. The lower support 52, the upper support 53, and the middle support 54 may be coupled to the frame 51.

The frame 51 may include a pair of facing support plates 511 and a coupling rod 512 for coupling them. The frame 51 may be substantially hexahedral as a whole. The support plate 511 may have a substantially rectangular shape. An opening 513 may be defined in the support plate 511 to facilitate a fluid to flow in and out of the frame 51 for the chemical strengthening. A slit 514 may be defined on the support plate 511 to enable horizontal movement and fixation of the upper support 53 and/or the middle support 54. A groove 515 may be defined in the support plate 511 to enable vertical movement and fixation of the upper support 53 and/or the middle support 54.

Although two or more lower supports 52 may be provided, it may be advantageous to provide three or more lower supports 52 in order to improve the residual salt removal effect as described above. The lower support 52 may include the shaft 521 inserted into a groove 518 of the frame 51, and the lower support 52 may define a support groove 522. The lower end of the glass plate G may be positioned in the support groove 522. The shaft 521 may be rotatably disposed. As the shaft 521 rotates, the lower support 52 may rotate around the rotation axis together, and the support groove 522 may also rotate. While the lower support 52 rotates, the shaft 521 keeps inserted into the groove 518, so the position of the lower support 52 may not be changed in the frame 51. When the lower support 52 rotates, the shaft 521 may be positioned within the same groove 518, and the position of the rotation axis of the lower support 52 may or may not be changed in the cassette 50.

The shaft 521 may be coupled to the aforementioned motor 60, and the shaft 521 may be rotated by driving the motor 60. The shaft 521 may be directly or indirectly coupled to the rotation shaft of the motor 60 positioned outside the cassette 50. A small motor may be mounted inside the lower support 52 to rotate the lower support 52 around a rotational axis parallel to an extending direction (e.g., the first direction x) of the lower support 52. The support groove 522 may be defined concentrically with respect to the rotation axis of the lower support 52. Opposite sides or one side of the support groove 522 may have a substantially disk shape. The lower end of the glass plate G may be positioned in the support groove 522.

Although not shown, the frame 51 or the lower support 52 may include a fixing member capable of preventing the rotation of the lower support 52. For example, before the chemical strengthening, and when the cassette 50 is moved while the glass plates G are loaded on the cassette 50 or in a state in which the glass plates G are loaded, if the lower support 52 is rotated, the glass plate G may be damaged. Therefore, it is possible to temporarily limit the rotation of the lower support 52 by the fixing member. The upper supports 53 may be provided as a pair. The upper support 53 may include a shaft 531 inserted into the groove 515 or the slit 514 of the frame 51, and the upper support 53 may define a holding groove 532 therein. The holding groove 532 may be formed concentrically with respect to a central axis of the upper support 53. Opposite sides or one side of the holding groove 532 may have a substantially disk shape. A pair of upper supports 53 may be disposed and fixed to be parallel to the frame 51, and the holding groove 532 may hold opposite sides of substantially the upper side of the glass plate G.

The middle supports 54 may also be provided as a pair. The middle support 54 may include a shaft 541 inserted into the groove 515 or the slit 514 of the frame 51, and the middle support 54 may define a holding groove 542 thereof. The holding groove 542 may be formed concentrically with respect to a central axis of the middle support 54. Opposite sides or one side of the holding groove 542 may have a substantially disk shape. A pair of middle supports 54 may be disposed and fixed to be parallel to the frame 51, and the holding groove 542 may hold opposite sides of substantially the middle side of the glass plate G.

The middle support 54 may have substantially the same structure as the upper support 53. Each of the number of holding grooves 532 of the upper support 53 and the number of holding grooves 542 of the middle support 54 may correspond to the number of glass plates G that the cassette 50 may load therein. The position and distance of the upper support 53 and the middle support 54 may be adjusted to provide optimal mounting according to the size of the loaded glass plates G. To this end, the support plate 511 of the frame 51 may define a plurality of grooves 515 and/or slits 514 therein to which the shafts 531 and 541 of the upper support 53 and the middle support 54 may be fixed.

Figure 5:
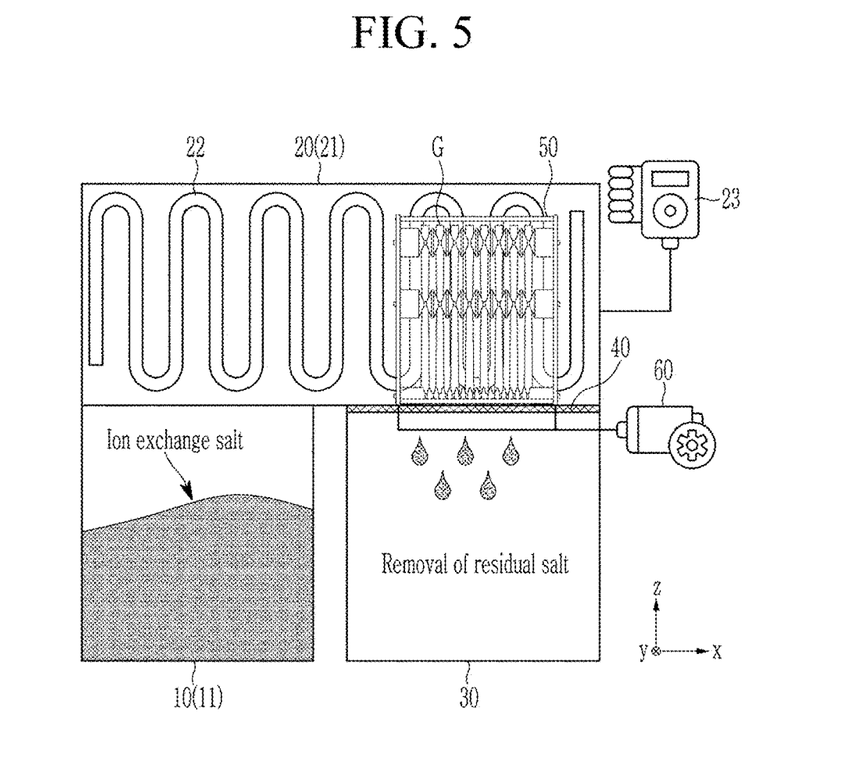
FIG. 5 and FIG. 6 each schematically illustrate a chemical strengthening system according to another embodiment.
Figure 6:
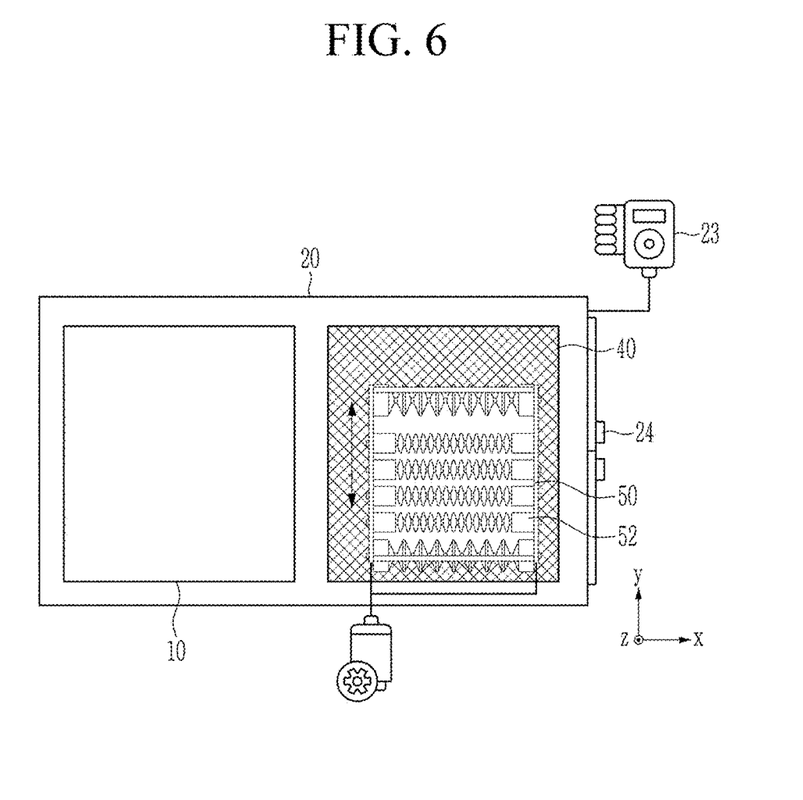
Figure 7:
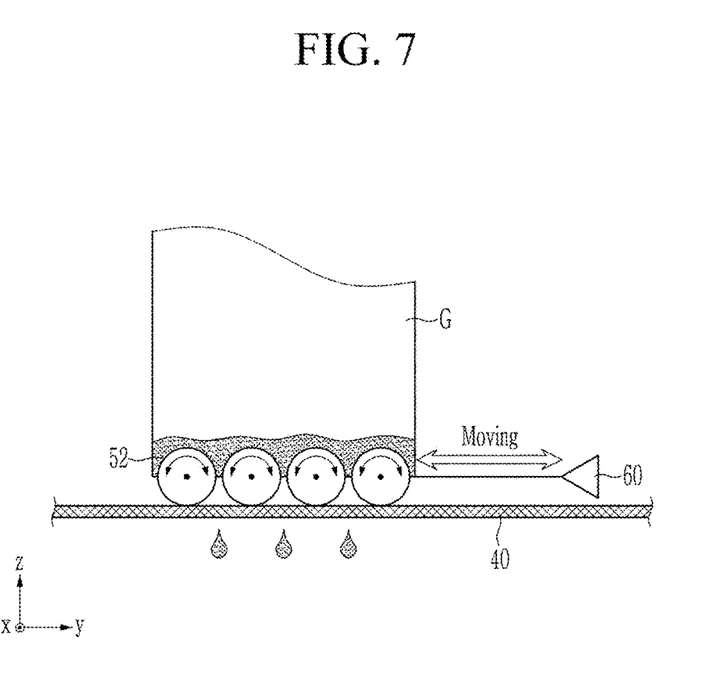
FIG. 7 illustrates a schematic view for explaining removal of a residual salt in the chemical strengthening system illustrated in FIG. 5 and FIG. 6.

FIG. 5 and FIG. 6 each schematically illustrate a chemical strengthening system according to an embodiment, and FIG. 7 illustrates a schematic view for explaining removal of a residual salt in the chemical strengthening system illustrated in FIG. 5 and FIG. 6. FIG. 5 and FIG. 6 may correspond to a front view and a top plan view of the chemical strengthening system, respectively.

The embodiment shown in FIG. 5 to FIG. 7 will be mainly described with respect to differences from the above-described embodiment.

Referring to FIG. 5 and FIG. 6, the chemical strengthening system may include the strengthening part 10, the heating part 20, and the discharging part 30. The chemical strengthening system may include a mesh member 40 positioned between the heating part 20 and the discharging part 30. The chemical strengthening system may include the cassette 50 that is movably disposed between the strengthening part 10 and the heating part 20. The cassette 50 may be introduced into the heating part 20 through the door 24 that may be positioned on a side surface of the heating part 20, and may be discharged to the outside of the heating part 20.

The chemical strengthening system may include the motor 60 for moving the cassette 50 along the second direction y. The motor 60 may be positioned outside the cassette 50, and may be mechanically coupled to the cassette 50 through a known power transmission device (for example, coupled to the frame 51 of the cassette 50). The motor 60 and the power transmission device may push or pull the cassette 50 so that the cassette 50 moves in a straight line between the first point and the second point of the mesh member 40 along the second direction y.

The lower support 52 of the cassette 50 may be rotatably disposed. Unlike the above-described embodiment, the lower support 52 itself does not rotate by the driving of the motor 60, but the lower support 52 may rotate when the cassette 50 is moved.

Referring to FIG. 7, the lower support 52 may contact the mesh member 40 on the discharging part 30. Accordingly, when the cassette 50 is moved along the second direction y by the driving of the motor 60, the lower support 52 may rotate around the rotation axis like a wheel of a vehicle. As the lower support 52 rotates, the residual salt is not formed at the lower end of the glass plate G or does not collect in the contact portion of the glass plate G and the lower support 52, but it may flow down on the lower support 52. That is, by rotating the lower support 52, a surface area of the residual salt contacting the lower support 52 may be increased, and the residual salt may be effectively removed through a drain effect according to the contact with the lower support 52.

When the cassette 50 is moved, the lower support 52 may be rotated, and the lower support 52 may be disposed so that the rotation axis thereof (e.g., the first direction x) may be perpendicular to the movement direction of the cassette 50. As illustrated, when the cassette 50 is moved in the second direction y, the shaft of the lower support 52 may be parallel to the first direction x. When the cassette 50 is moved in the first direction x, the shaft of the lower support 52 may be parallel to the second direction y.

Figure 8:
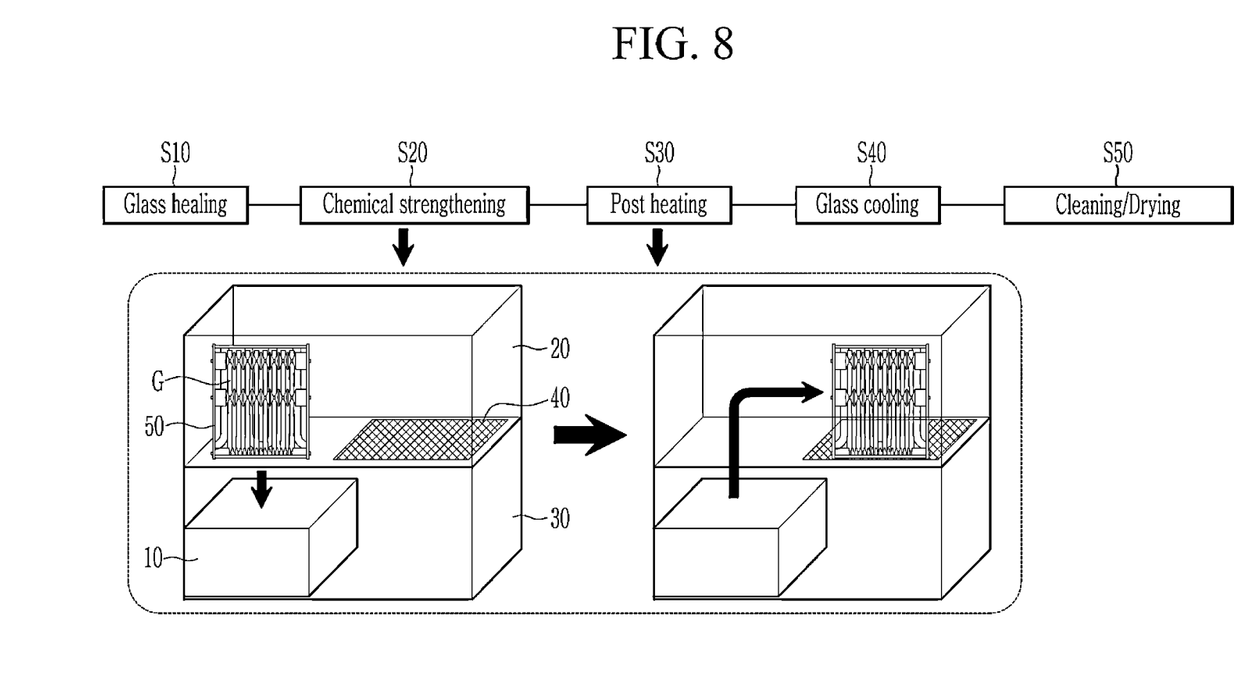
FIG. 8 illustrates a tempered glass manufacturing process according to an embodiment.

FIG. 8 illustrates a manufacturing process of a tempered glass plate according to an embodiment.

Referring to FIG. 8, a process of manufacturing a tempered glass plate will be described. A healing step (S10) of removing contaminants from the surface of the glass plate G prepared through cutting, chamfering, polishing, etc. may be performed.

After the healing step S10, a step S20 of chemically strengthening the glass plate G may be performed. The glass plate G may be inputted into the strengthening part 10 of the chemical strengthening system according to the embodiment in the state loaded in the cassette 50. As described above, in the chemical strengthening step (S20), a compressive stress layer may be formed on the surface of the glass plate G by an ion exchange method. Although the chemical strengthening step (S20) may be performed at a temperature of about 350 degrees in Celsius (° C.) to about 400° C., it may preferably be performed at a temperature of about 360° C. to about 370° C. When the strengthening temperature is higher than 370° C., it may be difficult to control a strengthening time and a depth of layer ("DOL"). When the strengthening temperature is equal to or less than 360° C., it may be difficult to secure a target surface compressive stress ("CS") and the DOL.

After the chemical strengthening step (S20), a post-heating step (S30) of heat-treating the glass plate G may be performed. The glass plate G may be conveyed from the strengthening part 10 to the heating part 20 in a state of being loaded on the cassette 50, and may be placed on the mesh member 40 positioned between the heating part 20 and the discharging part 30. The post-heating step (S30) may be preferably performed at a temperature of about 330° C. to about 370° C. When the post heat temperature is equal to or higher than 370° C., the target surface compressive stress (CS) loss may occur. When the post-heating temperature is equal to or less than 330° C., the ion exchange salts may remain and may be solidified.

In the post-heating step (S30), the surface compressive stress of the CS of the glass plate G may be secondarily increased. In addition, the ion exchange salt remaining in the glass plate G and the cassette 50 may flow down to the discharging part 30 through the mesh member 40. In order to increase the ability to remove the residual salt, as described above, the lower support 52 of the cassette 50 for supporting the lower end of the glass plate G is rotated directly or indirectly by the motor 60, thereby increasing the surface area of the residual salt contacting the lower support 52 and increasing the drain effect. Accordingly, it is possible to improve or prevent the occurrence of interface stress and poor appearance quality (for example, bending, sagging, or denting of the glass plate G) due to the solidification of the residual salt. By removing the salt from the contact portion between the glass plate G and the lower support 52, it is possible to effectively prevent the glass plate G from cracking due to the difference in heat expansion coefficient between the glass and the salt.

According to the embodiment, since the residual salt may be removed without chemical treatment in the post-heating step (S30), environmental pollution may be reduced when the salt is removed after the chemical strengthening. In addition, it is possible to reduce the post-heating temperature and time, thereby improving the CS and stiffness reduction due to the post-heating.

A pre-heating step may be performed before the chemical strengthening step (S20). The pre-heating step may be performed in the heating part 20. In the surface of the glass plate G pre-heated in the pre-heating step, the surface compressive stress may be increased by the difference between the pre-heating temperature and the strengthening temperature, and the surface ion exchange in the chemical strengthening step (S20).

After the post-heating step (S30), a step S40 of cooling the glass plate G may be performed. The cooling step (S40) may be performed after taking out the glass plate G from the cassette 50, but may be performed in the state in which the glass plate G is loaded in the cassette 50.

After the cooling step (S40), a step (S50) of cleaning and drying the glass plate may be performed.

Figure 9:
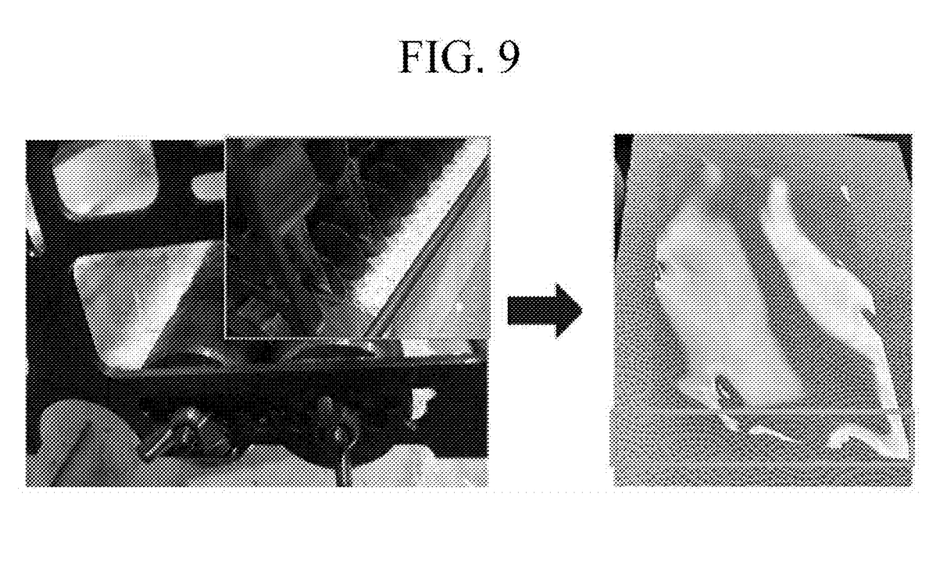
FIG. 9 illustrates a photograph of a cassette in which a lower support does not rotate and a glass plate subjected to chemical strengthening and post-heat treatment using the same.
Figure 10:
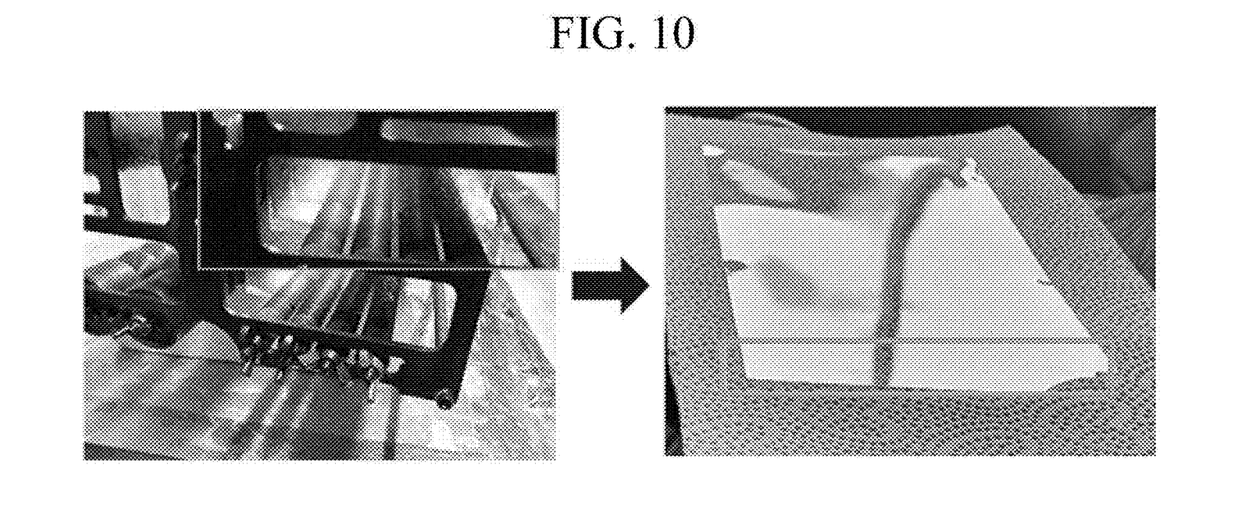
FIG. 10 illustrates a photograph of a cassette in which a lower support rotates and of a glass plate subjected to chemical strengthening and post-heat treatment using the same.

FIG. 9 illustrates a photograph of a cassette in which a lower support does not rotate and a glass plate subjected to chemical strengthening and post-heat treatment using the same, and FIG. 10 illustrates a photograph of a cassette in which a lower support rotates and of a glass plate subjected to chemical strengthening and post-heat treatment using the same.

Referring to FIG. 9, the glass plate (the right figure) subjected to the chemical strengthening and post-heat treatment by loading the glass plate on the conventional cassette (the left figure) in which the lower support of the cassette does not rotate is shown. It was confirmed that the salt was solidified at the lower end portion of the glass plate and there were dents.

Referring to FIG. 10, the glass plate (the right figure) subjected to the chemical strengthening and post-heat treatment by loading the glass plate on the cassette (the left figure) according to the embodiment in which the lower support of the cassette rotates is shown. It was confirmed that the salt solidification and dent marks at the lower end portion of the glass plate were significantly improved compared to the glass plate shown in FIG. 9.

Figure 11:
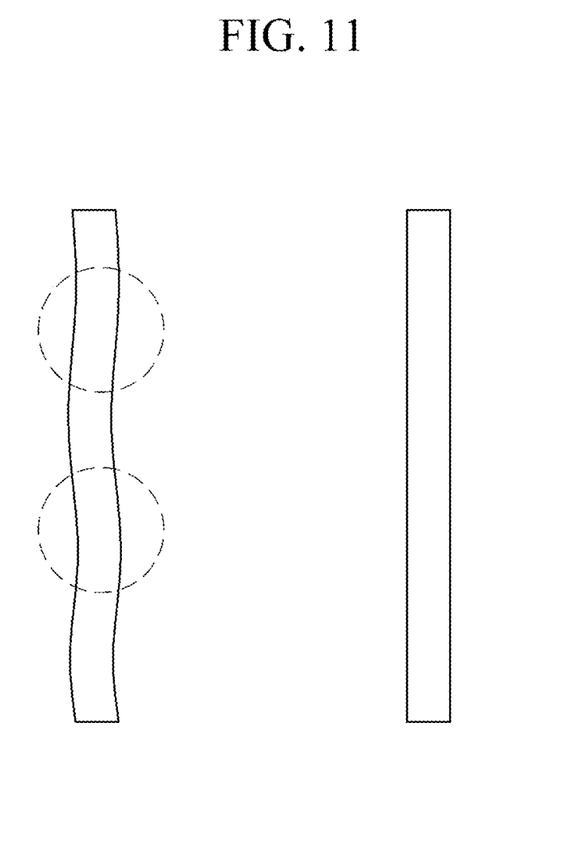
FIG. 11 schematically illustrates a lower end of a glass plate subjected to chemical strengthening and post-heat treatment by using a cassette in which a lower support does not rotate, and a lower end of a glass plate subjected to chemical strengthening and post-heat treatment by using a cassette in which a lower support rotates.

FIG. 11 schematically illustrates a lower end of a glass plate subjected to chemical strengthening and post-heat treatment by using a cassette in which a lower support does not rotate, and a lower end of a glass plate subjected to chemical strengthening and post-heat treatment by using a cassette in which a lower support rotates.

Referring to FIG. 11, as for the glass plate (the left figure) that was post-heated by using the cassette in which the lower support did not rotate, the glass plate may have bending or nicking defects, as indicated by the dotted circle, due to salt accumulation due to the residual salt at the contact portion with the lower support. In contrast, since the residual salt may be effectively removed from the glass plate (the right figure) that is post-heat treated while rotating the lower support, it is possible to prevent or improve the occurrence of defects in the glass plate.

While the invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A chemical strengthening system, comprising:
a strengthening part in which chemical strengthening of a glass plate is performed;
a heating part in which a post-heat treatment of the glass plate is performed;
a cassette in which the glass plate is loaded and which is movable between the strengthening part and the heating part;
a discharging part overlapping the heating part; and
a mesh member positioned between the heating part and the discharging part,
wherein the cassette includes a lower support which supports a lower end portion of the glass plate,
wherein the lower support is rotatable with respect to an axis of rotation,
wherein the axis of rotation does not move relatively within the cassette, and
wherein, during the post-heat treatment, the cassette is positioned on the mesh member.

2. The chemical strengthening system of claim 1, further comprising
a motor which rotates the lower support.

3. The chemical strengthening system of claim 1, wherein the lower support contacts the mesh member, and when the lower support is rotated, the cassette moves on the mesh member.

4. The chemical strengthening system of claim 3, wherein the axis of rotation of the lower support is perpendicular to a moving direction of the cassette.

5. The chemical strengthening system of claim 1, further comprising
a motor which drives the cassette to move in a straight line on the mesh member,
wherein the lower support is rotated when the cassette is moved.

6. The chemical strengthening system of claim 1, wherein the lower support is provided as three or more lower supports.

7. The chemical strengthening system of claim 1, wherein the lower support defines a support groove formed concentrically with respect to the axis of rotation, and the glass plate is disposed so that a lower end of the glass plate is positioned in the support groove.

8. The chemical strengthening system of claim 1, wherein the cassette further includes a frame, and
the lower support includes a shaft inserted into a groove of the frame and defines a support groove in which the lower end of the glass plate is positioned.

9. The chemical strengthening system of claim 8, wherein the cassette further includes an upper support coupled to the frame to hold opposite sides of an upper portion of the glass plate.

10. The chemical strengthening system of claim 8, wherein
the cassette further includes a middle support coupled to the frame to hold opposite sides of a middle portion of the glass plate.

* * * * *